(12) United States Patent
Spiess

(10) Patent No.: US 6,349,603 B1
(45) Date of Patent: Feb. 26, 2002

(54) FITTING FOR HYDRAULIC FLOW MEASUREMENT

(75) Inventor: Fritz Spiess, Unterlunkhofen (CH)

(73) Assignee: Dumser Metallbau GmbH & Co. KG, Landau (DE)

(*) Notice: Subject to any disclaimer, the term of this patent is extended or adjusted under 35 U.S.C. 154(b) by 0 days.

(21) Appl. No.: 09/273,108

(22) Filed: Mar. 19, 1999

(30) Foreign Application Priority Data

Mar. 19, 1998 (CH) .............................. 0666/98

(51) Int. Cl.[7] .................... G01F 1/40; G01F 23/02
(52) U.S. Cl. ................. 73/861.55; 73/861.57; 73/323
(58) Field of Search .................. 73/861.54, 861.55, 73/861.52, 861.56, 861.57, 323, 305, 319, 322

(56) References Cited

U.S. PATENT DOCUMENTS 3,603,148 A * 9/1971 Rikuta ..................... 73/861.55
4,050,305 A * 9/1977 Evans et al. ............. 73/861.55
4,194,394 A * 3/1980 Bartholomaus .......... 73/861.54
4,459,859 A * 7/1984 Price et al. .............. 73/861.54

FOREIGN PATENT DOCUMENTS

DE          8220193       10/1982

* cited by examiner

*Primary Examiner*—Harshad Patel
(74) *Attorney, Agent, or Firm*—Friedrich Kueffner

(57) ABSTRACT

A fitting for hydraulic flow measurement includes a fitting housing containing a principal flow duct, a throttle point arranged in the principal duct, a bypass duct for conducting a partial flow connected behind the throttle point to the principal duct, and a flow measuring device with a movable measuring and indicating member for the partial flow. The fitting housing includes a side pipe piece forming a side chamber, wherein the side chamber is directly connected to the principal duct in front of and behind the throttle point in the housing interior. The flow measuring device provided with a measuring part and an indicating part is held in the side pipe piece by single hole mounting and closes off the side chamber to the outside, wherein the indicating part is located outside of the side pipe piece and only the measuring part is acted upon by the partial flow.

5 Claims, 2 Drawing Sheets

FITTING FOR HYDRAULIC FLOW MEASUREMENT

BACKGROUND OF THE INVENTION

1. Field of the Invention

The present invention relates to a fitting or instrument for hydraulic flow measurement. The fitting includes a fitting housing containing a principal flow duct, a throttle point arranged in the principal duct, a bypass duct for conducting a partial flow connected behind the throttle point to the principal duct, and a flow measuring device with a movable measuring and indicating member for the partial flow.

2. Description of the Related Art

Fittings of the above-described type can be used for various flow media; they are in use particularly in hot water heating systems in order to indicate the flow of hot water through the various lines of the system. Used for adjusting the flow quantity is an adjustable throttle member, for example, a ball valve or the like, which may be integrated in the fitting housing or may be mounted separately in the line.

In a fitting of the above-described type disclosed in DE-GM 82 20 193.5, a bypass line is flanged outside of the principal housing to two housing connections, wherein the axis of the bypass line extends parallel to the axis of the principal duct. The bypass line includes a window and contains as a measuring length a transparent pipe section through which the partial flow flows. Arranged in the pipe section is a measuring piston which is movable against a helical spring, wherein the measuring piston simultaneously forms the indicating member. A stop valve each is mounted in the two housing connections mentioned above, so that there is no continuous flow through the bypass duct, i.e., in order to limit the contamination of the measuring device by deposits from the flow medium. The manufacture and assembly of this known fitting is very complicated; in particular, various sealing members are required. In addition, for carrying out a correct measurement, both of the stop valves mentioned before have to be open; however, the stop valves are only useful if they are completely closed immediately after the measurement.

SUMMARY OF THE INVENTION

Therefore, it is the primary object of the present invention to eliminate the disadvantages of the prior art fittings of the type described above, while maintaining the flow measurement in the auxiliary flow duct. In particular, the operations and expenses of manufacture and assembly of the fitting are to be reduced and the danger of contamination by deposits from the flow medium are to be eliminated.

In accordance with the present invention, the fitting housing includes a side pipe piece forming a side chamber, wherein the side chamber forms the bypass duct and is directly connected to the principal duct in front of and behind the throttle point in the housing interior. The flow measuring device provided with a measuring part and an indicating part is held in the side pipe piece by single hole mounting and closes off the side chamber to the outside, wherein the indicating part is located outside of the side pipe piece and only the measuring part is acted upon by the partial flow.

The present invention makes it possible to significantly simplify the assembly of the fitting because of the single hole mounting of the flow measuring device and because special locking members for separating the bypass duct from the principal duct are not required. In addition, the fitting housing can be constructed with a relatively short structural length at any given nominal diameter. Although the indicating part is in contact with the flow medium, the indicating part is practically completely separated from the flow, so that the readability is maintained without maintenance.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
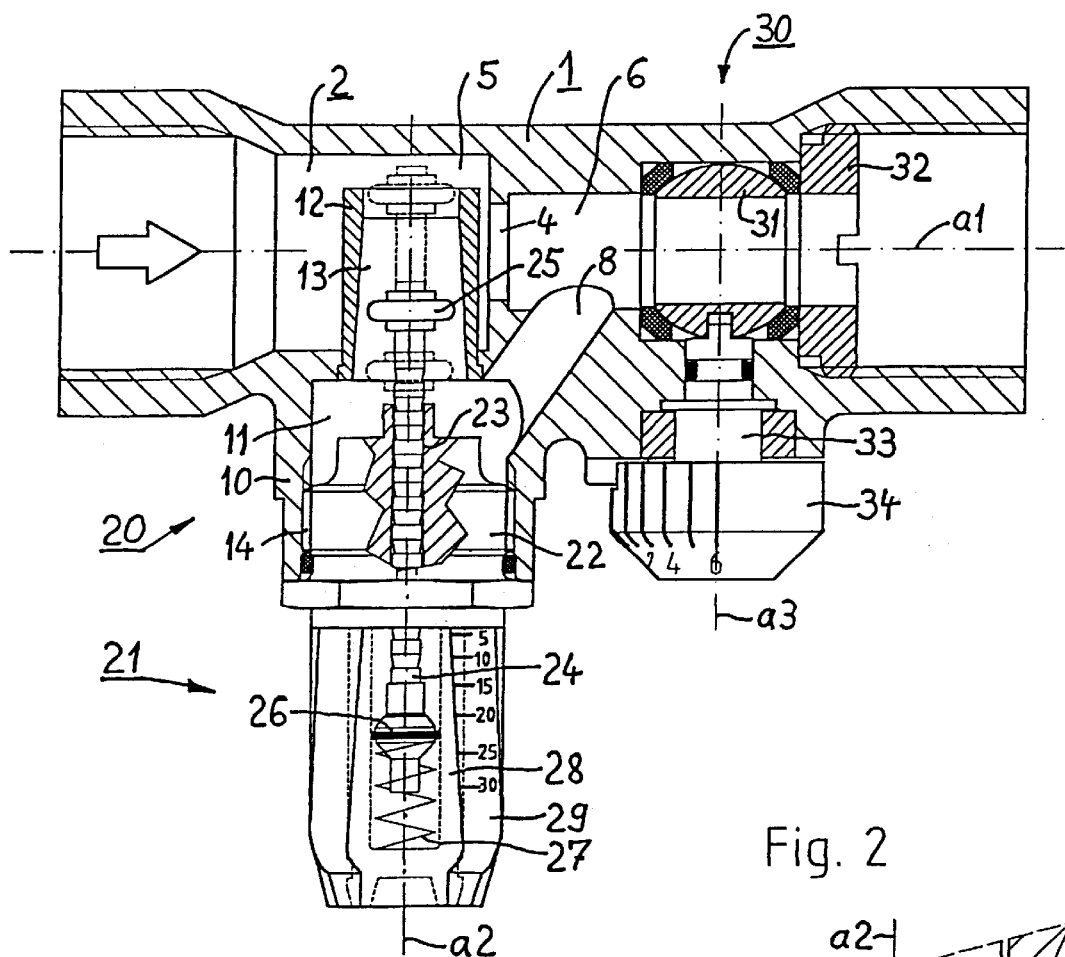
FIG. 1 is a side view, partially in section, of a first embodiment according to the present invention combined with a ball valve.

FIG. 1 of the drawing shows an embodiment of the measuring fitting according to the present invention. The fitting includes a fitting housing 1 which surrounds a principal flow duct 2 with the principal axis a1. Fittings of this type are used, for example, in hot water heating systems, wherein the medium whose flow is to be measured, i.e., heating water, flows through the principal duct 2 in the direction indicated by an arrow.

In the embodiment of the invention, an adjustable throttle member in the form of a ball valve 30 is integrated in the fitting housing in order to adjust the flow to a certain value; however, such a throttle member can also be mounted independently of the measuring fitting at a different location in the line, or the flow can be influenced in a different manner, for example, by controlling a circulating pump.

A throttle point 4 is arranged in the principal duct 2 for carrying out the flow measurement. The throttle point 4 divides the principal duct 2 in a portion 5 in front of the throttle point 4 and a portion 6 behind the throttle point 4. In accordance with the measuring principle used in this embodiment and known in the art, the pressure difference which is dependent on the flow and exists between the points in front of and following the throttle point 4 produces a partial flow of the medium which is conducted through a bypass duct which is connected to the principal duct 2 at the locations mentioned above. From the measurement of the partial flow in the bypass duct, the flow in the principal duct 2 can be determined.

For forming a bypass duct and for mounting a flow measuring device for measuring the partial flow, the fitting housing 1 shown in FIG. 1 includes a side pipe piece 10 which surrounds a side chamber 11. The axis of the side pipe piece 10 which extends perpendicularly of the principal axis a1 is indicated by a2 in FIG. 1. The side chamber 11 is connected in the interior of the housing 1 directly and permanently to the principal duct 2 in front of and behind the throttle point 4, i.e., through the bore 13 of a pipe piece 12 to the portion 5, on the one hand, and through an oblique bore 8 to the portion 6 of the principal duct 2, on the other hand. The hollow spaces mentioned, i.e., the bore 13, the side chamber 11 and the bore 8, together form the bypass duct. Thus, the bypass duct is connected in the interior of the housing 1 permanently and without stop members to the principal duct 2.

In the measuring device for the partial flow in the bypass duct illustrated in FIG. 1, it must be generally distinguished between a measuring part 20 and an indicating part 21. This flow measuring device is mounted by single hole mounting in the side pipe piece 10 by sealingly placing a "supporting" screw part 22 into an internal thread 14 of the pipe piece 10. This closes the side chamber 11 off from the outside, wherein the indicating part 22 is located outside of the pipe piece 10. The measuring part 20, on the other hand, faces the chamber 11 and only this measuring part 20 is in contact with the partial flow in the bypass duct.

The construction and the operation of the flow measuring device 20, 21 are as follows: a baffle plate 25, a connecting rod 24 and an indicator disk 26 together form a measuring and indicating member, wherein the rod 24 is longitudinally movably guided in an axial bore 23 of the screw part 22. A viewing glass 28 of the indicating part is tightly connected, in a manner not illustrated in detail, to the screw part 22. The lower end of the rod 24 with the disk 26 moves within the interior of the viewing glass 28 and is pressed against the viewing glass through a compression spring 27. The viewing glass 28 is surrounded by a sleeve-like scale carrier 29. This scale carrier 29 is cut longitudinally and carries at the cut surface the scale inscription; the scale refers directly to the flow in the principal duct 2, for example, L/min. The scale carrier 29 is axially secured to the viewing window 28, however, the scale carrier 29 can be rotated about the axis a2 into a suitable reading direction.

As is apparent from FIG. 1, the actual bypass measuring length is located within the pipe piece 12. The partial flow in the bypass duct acts on the baffle plate 25 and the measuring and indicating member 24, 25 and 26 is displaced against the force of the spring 27. The two extreme positions of the baffle plate 25 are shown in broken lines in FIG. 1. As also apparent from FIG. 1, the pipe piece 12 determining the measuring length extends into the portion 5 of the principal duct 2 located in front of the throttle point 4, wherein the principal flow flows around the pipe piece 12 and the partial flow enters the pipe piece from above. The bore 13 forms an expansion of the side chamber 11 in the side pipe piece 10.

When the pipe piece 12 is arranged appropriately, the measuring length could also be located only partially in the principal duct and with its lower portion in the side chamber 11; the measuring length could also be shifted into the pipe piece if the pipe piece 10 and the side chamber 11 are extended appropriately. However, the arrangement in accordance with FIG. 1 has the advantage that the total dimension of the fitting transversely of the principal axis a1, i.e., in the direction of the axis a2, is significantly reduced.

It may be useful to provide a transparent protective cap, not shown, over the indicating part 21 in order to protect it against external impacts and contamination. Such a protective cap can be placed over the external circumference of the side pipe piece member 10 and may be connected to the scale carrier 29 in such a way that the scale carrier can be rotated together with the cap.

Figure 2:
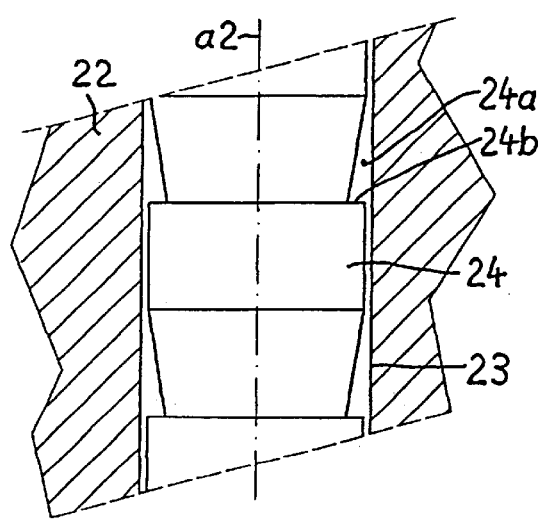
FIG. 2 is an illustration of a detail of FIG. 1 on a larger scale.

As mentioned above and as is apparent from FIG. 1, the partial flow in the bypass duct acts only on the measuring part 20. However, due to the necessary play between the connecting rod 24 and the bore 23, a connection exists between the side chamber 11 and the interior of the viewing glass 28; this means that the viewing glass 28 is filled with "standing" liquid. However, during each movement of the parts 24, 25 and 26, a certain liquid exchange also takes place along the rod 24; if the rod is moved downwardly as seen in FIG. 1, the liquid is displaced out of the viewing glass 28 into the chamber 11, and when the rod is moved in the opposite direction, liquid is drawn into the viewing glass 28. Consequently, when the bypass duct is permanently connected to the principal duct 2, variations of the flow or pulsations superimposed by the flow could over time cause fine dirt and suspended particles which are entrained in the principal flow to reach the viewing glass and contaminate the viewing glass. In order to counteract this effect, the connecting rod 24 may be constructed in a special manner, as shown on a larger scale in FIG. 2.

The rod 24 is provided with a large number of circumferential grooves 24a which provide the rod 24 with a type of sawtooth profile. The annular surfaces 24b of the grooves 24a located in radial planes perpendicularly of the axis a2 are facing the side chamber 11. The effect of these grooves is such that liquid whirls are formed in the grooves when the rod 24 is moved longitudinally and, as described above, as a result of the flow in the gap along the rod directed in the opposite direction. This causes the dirt particles which have been entrained downwardly in the direction of the viewing glass to be "entrapped" in the grooves and to be deposited primarily on the annular surfaces 24b. When liquid is displaced in the opposite direction out of the viewing glass, the liquid can convey the particles deposited in the grooves back upwardly. This makes it possible to prevent a harmful contamination of the viewing glass over long periods of operation or even permanently.

The ball valve 30 integrated into the fitting according to FIG. 1 is essentially known in the art and is constructed as follows: the valve plug 31 with the corresponding annular sealing members is held by a threaded ring 32 in the fitting housing 1. A rotating shaft 33 is in engagement with the plug 31, wherein the shaft 33 is mounted in a radial bore of the housing 1. The plug 31 is actuated by means of a handle 34 connected to the shaft 33. An adjusting scale extending over the angle of rotation of 90° is provided on the circumference and on, for example, the conically shaped end face of the handle 34 and, in addition, is repeated in a point-symmetrical manner on the "rear side" of the grip, not shown in the drawing. This means that the scale can be read easily in all possible mounting situations.

In the illustrated arrangement of the ball valve 30 in the fitting, the axis of rotation a3 of the handle 34 extending out of the fitting housing 1 extends parallel to the axis a2 of the side pipe piece 10. Consequently, the handle 34 and the indicating part 21 with the flow scale are located in the same plane next to each other and on the same side of the principal axis a1. This is a significant advantage because the flow value adjusted on the ball valve can always be read immediately on the adjacent indicating part. In addition, the possibility mentioned above of being able to turn the scale carrier 29 on the viewing glass 28 in dependence on the mounted position of the fitting, i.e. depending on the viewing direction of the user, is particularly advantageous in this connection.

Figure 3:
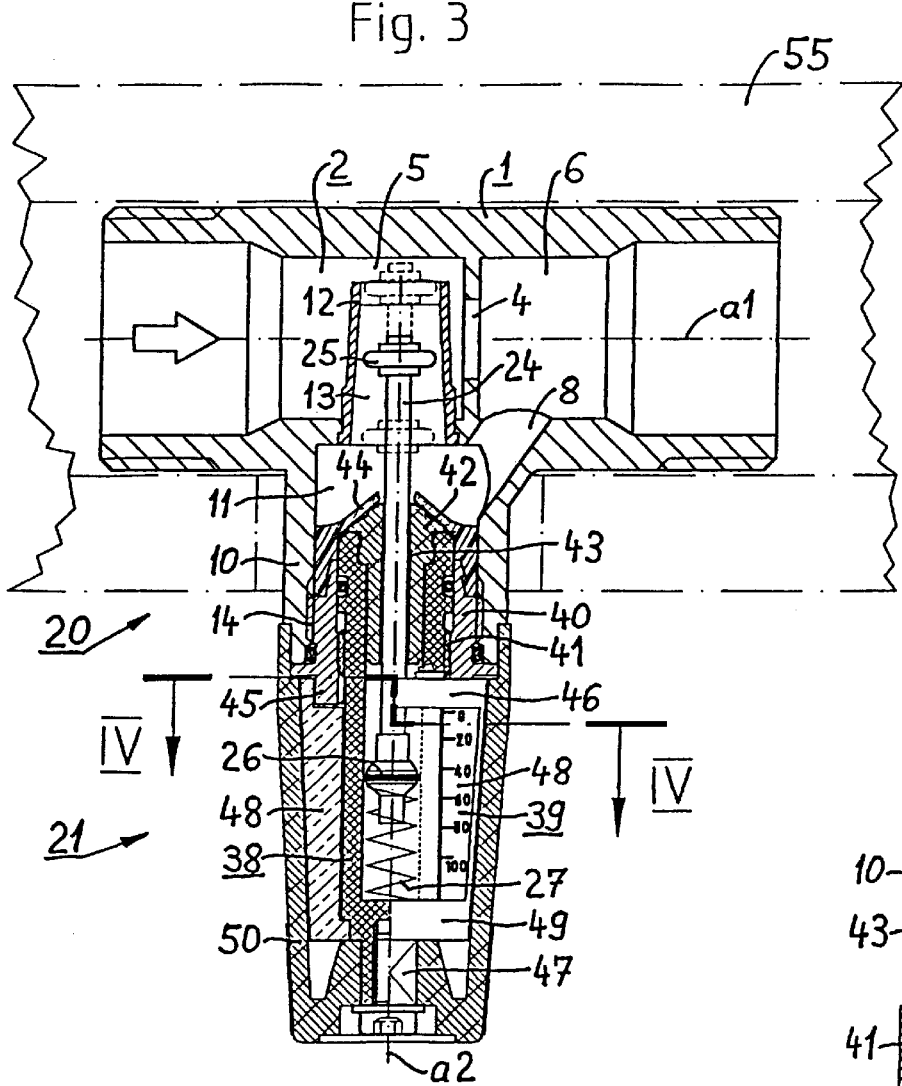
FIG. 3 is a side view, similar to FIG. 1, showing another embodiment of the present invention, wherein the flow measuring device is shown in the condition during the measurement.
Figure 5:
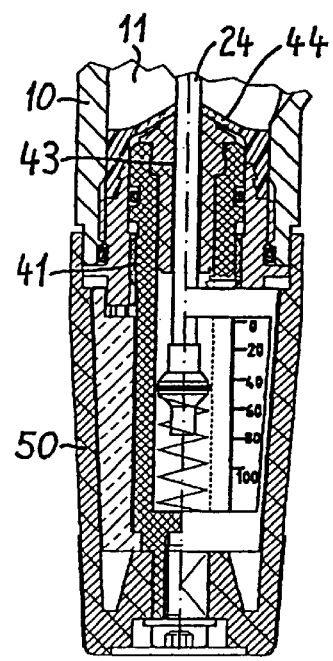
FIG. 5 is a partial illustration analogous to FIG. 3, however, shown with the measuring device in the blocked position.
Figure 4:
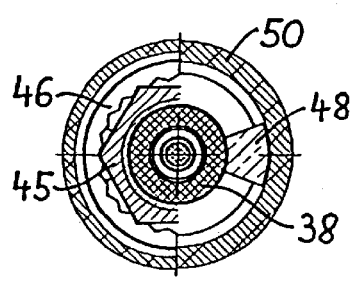
FIG. 4 is a sectional view taken along sectional line IV—IV in FIG. 3.

Another embodiment of the fitting according to the present invention is illustrated in FIGS. 3–5. This embodiment does not have an integrated adjustable throttle member for the flow. In the embodiment of FIGS. 3–5, the parts having the same function are provided with the same reference numerals as in FIGS. 1 and 2, although the structural configuration is partially somewhat different. The differences in this additional embodiment as compared to the embodiment discussed above refer predominantly to structural features for keeping the viewing glass clean and appropriate deviations in the construction of the flow measuring device. In FIGS. 3 and 5, the scale carrier 39 and the lower part of the viewing glass 38 are partially shown in section and partially in a side view.

The fitting housing 1 with the principal duct 2, the side pipe piece 10 with the side chamber 11, the bypass duct 13, 11, 8, the expansion 13 of the pipe 12 for the measuring length and the movable measuring and indicating member 24, 25 and 26 are essentially the same as in the example of FIG. 1; the only difference is that the connecting rod 24 does not have any circumferential grooves. A screw part 40 of the flow measuring device 20, 21 is again tightly screwed into the internal thread 14 of the side pipe piece member 10 so that the chamber 11 is closed to the outside. The viewing glass 38 extends into the screw part 40 and is constructed as a threaded spindle, wherein its external thread is in engagement with an internal thread 41 of the screw part. A head part 42 is inserted at the end of the viewing glass on the side of the chamber. This head part 42 contains the axial bore 43 which extends between the chamber 11 and the interior of the viewing glass 28 and guides the connecting rod 24. An elastomer part placed within the side piece member 10 on the screw part 40 forms a sleeve 44 with a throughbore, wherein the sleeve 44 rests against the head part 42 and surrounds the rod 24. The manner of operation of this rubber-elastic sleeve 44 will be explained below in connection with FIG. 5.

The indicating part 21 outside of the side pipe piece 10 is constructed as follows: the viewing glass 38 is surrounded by a transparent cap 50. This cap 50 extends around the circumference of the pipe piece 10, on the one hand, and is connected to the viewing glass 38 for rotation therewith by engaging over a square profile 47 integrally formed on the viewing glass. The scale carrier 39 is arranged in the space between the viewing glass 38 and the cap 50. The scale carrier 39 is composed of two longitudinal webs 48 whose ends are connected through two rings 46 and 49 which surround the viewing glass 38. The longitudinal webs 48 have scale inscriptions which are visible on two oppositely located sides of the viewing glass. The scale carrier 39 is held with a recessed edge of the ring 49, shown on the left of FIGS. 3 and 5, so as to be rotatable on the viewing glass and is axially held between the viewing glass and the cap 50. The ring 46 has an internal toothing which engages over a hexagonal profile 45 provided on the screw part 40, as shown in FIG. 4. When the fitting or indicating part 21 is assembled, the scale carrier can be placed in an advantageous position of rotation for reading the scale carrier, as long as the cap 50 has not yet been mounted. This position of rotation is then maintained during use, however, it can also be adjusted as required.

By turning the cap 50, the viewing glass 38 is also turned through the square profile 47 and is axially displaced at the thread 41 relative to the screw part 40. The internal toothing of the ring 46 then slides along the hexagonal profile 45 and the scale carrier 39 maintains its position of rotation.

FIG. 3 shows the state during a measurement. The cap 50 is turned in the clockwise direction and the viewing glass 38 is moved as an "ascending spindle" forwardly toward the chamber 11. As a result of the axial stroke of the parts 38 and 42, the sleeve 44 is engaged and spread apart, so that the central bore of the sleeve 44 releases the rod 24. Consequently, the measuring and indicating member 24, 25, 26 can now axially freely move in the guide bore 43, i.e., the measuring and indicating member is adjusted in accordance with the partial flow in the bypass duct and can indicate the value since there is simultaneously a liquid connection along the bore 43 toward the interior of the viewing glass 38.

The measurement is terminated by turning the cap 50 back in a counter-clockwise direction by a certain amount, for example, a half turn or an entire turn; this results in the condition of FIG. 5. Since the viewing glass with the head part 42 yields by the distance corresponding to the rotation and inclination of the thread, spreading of the sleeve 44 as mentioned above does not occur. The sleeve bore becomes elastically narrower and rests sealingly around the rod 24. This causes the rod 24 to be locked and the existing flow indication is maintained. In particular, the chamber 11 is sealed off from the bore 43 and the liquid exchange in the viewing glass is interrupted. Of course, this position of rest in accordance with FIG. 5 prevails over the predominant portion of the time of operation; measurements in the state shown in FIG. 3 are usually only carried out after long periods of time and only last a very short time, so that a collection of dirt in the viewing glass is practically excluded.

Of course, a fitting with the flow measuring device constructed in accordance with FIGS. 3–5 can also be provided with a throttle member integrated in the housing in accordance with the valve 30 of FIG. 1. Also in this case, the arrangement of the axis a3 of the actuation of the valve described in FIG. 1 in relation to the axis a2 of the side pipe piece 10 is advantageous. This configuration also offers a good readability and accessibility in various mounting situations of the fitting.

FIG. 3 shows in dash-dot lines a thermal insulation 55 as it is frequently provided especially in the case of lines which conduct hot water. As is apparent, the outer configuration of the fitting is particularly advantageous since the insulation, usually in the form of half shells, only has to be slightly recessed in the area of the side pipe piece member 10.

While specific embodiments of the invention have been shown and described in detail to illustrate the inventive principles, it will be understood that the invention may be embodied otherwise without departing from such principles.

I claim:

1. A fitting for hydraulic flow measurement through a pipe in a unit of time, the fitting comprising a fitting housing containing a principal flow duct, a throttle point in the principal duct, a bypass duct conducting a partial flow connected to the principal duct in front of and behind the throttle point in a flow direction, a flow measuring device comprising a movable measuring and indicating member for measuring the partial flow, the fitting housing further comprising a side pipe piece forming a side chamber forming an inlet and an outlet for the bypass duct, wherein the side chamber is connected directly to the principal duct in an interior of the housing in front of and following the throttle point, the flow measuring member comprising a measuring part and an indicating part, the flow measuring member being mounted in an opening of the side pipe piece and closing off the side chamber from outside, wherein the indicating part is located outside of the side pipe piece, wherein the measuring part is mounted in an interior of a pipe portion forming the inlet of the side chamber, the flow measuring member further comprising a connecting rod longitudinally movably mounted in an axial bore of the flow measuring member, wherein the connecting rod connects the measuring part and the indicating part.

2. The fitting according to claim 1, wherein the measuring part protrudes into the principal duct.

3. The fitting according to claim 1, wherein the connecting rod has circumferential grooves forming a sawtooth profile, wherein annular surfaces of the grooves are located in radial planes so as to face the side chamber.

4. The fitting according to claim 1, the side chamber and the indicating part define a bore, the measuring and indicating member further comprising a connecting rod longitudinally movably mounted in the bore, further comprising a rubber-elastic sleeve surrounding the connecting rod for sealing the side chamber relative to the bore, and an axially adjustable lifting member for spreading the sleeve from the indicating part for releasing the connecting rod during measurements.

5. The fitting according to claim 4, wherein the indicating part comprises a viewing glass configured as a threaded spindle rotatable from outside and provided with a thread extending coaxially with the connecting rod, wherein the threaded spindle or a part connected thereto forms the lifting member.

* * * * *